(12) United States Patent
Stegmaier et al.

(10) Patent No.: US 6,516,703 B2
(45) Date of Patent: Feb. 11, 2003

(54) REACTION DISC HOUSING AND BRAKE SERVO UNIT COMPRISING SAME

(75) Inventors: Alwin Stegmaier, Blaichach (FR); Jean-Pierre Gautier, Trevou Treguignec (FR)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 09/868,707

(22) PCT Filed: May 17, 2001

(86) PCT No.: PCT/FR01/01507

§ 371 (c)(1), (2), (4) Date: Jun. 20, 2001

(87) PCT Pub. No.: WO01/87681

PCT Pub. Date: Nov. 22, 2001

(65) Prior Publication Data

US 2002/0125766 A1 Sep. 12, 2002

(30) Foreign Application Priority Data

May 19, 2000 (FR) .............................................. 00 06715

(51) Int. Cl.$^7$ ............................................. B60T 13/575
(52) U.S. Cl. ..................................................... 91/369.2
(58) Field of Search ............................... 91/369.2, 369.3

(56) References Cited

U.S. PATENT DOCUMENTS

| | | | | | |
|---|---|---|---|---|---|
| 4,437,390 A | * | 3/1984 | Ohta | ......................... | 91/369.2 |
| 4,729,288 A | * | 3/1988 | Thioux | ..................... | 91/369.2 |
| 5,062,348 A | * | 11/1991 | Gotoh et al. | ............... | 91/369.2 |
| 5,263,398 A | * | 11/1993 | Kobayashi et al. | ........ | 91/369.2 |
| 5,493,948 A | * | 2/1996 | Gautier et al. | ............. | 91/369.2 |

* cited by examiner

Primary Examiner—Edward K. Look
Assistant Examiner—Thomas E. Lazo
(74) Attorney, Agent, or Firm—Leo H McCormick, Jr.; Warren Comstock

(57) ABSTRACT

This invention relates to a housing for receiving a reaction disk in a pneumatic servomotor. The housing and reaction disk co-operate to resist too fast a forward travel of a piston when the brake is actuated and thereby avoid an undesired reopening of a passage connecting a front chamber with a rear chamber in a brake booster during a brake application. The reaction disk (39) is located in an inner space of the housing (47) that has a greater size than the volume of the disk (39). The disk (39) is initially deformed to completely fill the housing (47) by an input force corresponding to a desired brake application to limit the forward speed of the pneumatic piston and only thereafter as a reaction force develops during the brake application, does the reaction force balance the input force applied to the disk (39) during a brake application.

9 Claims, 9 Drawing Sheets

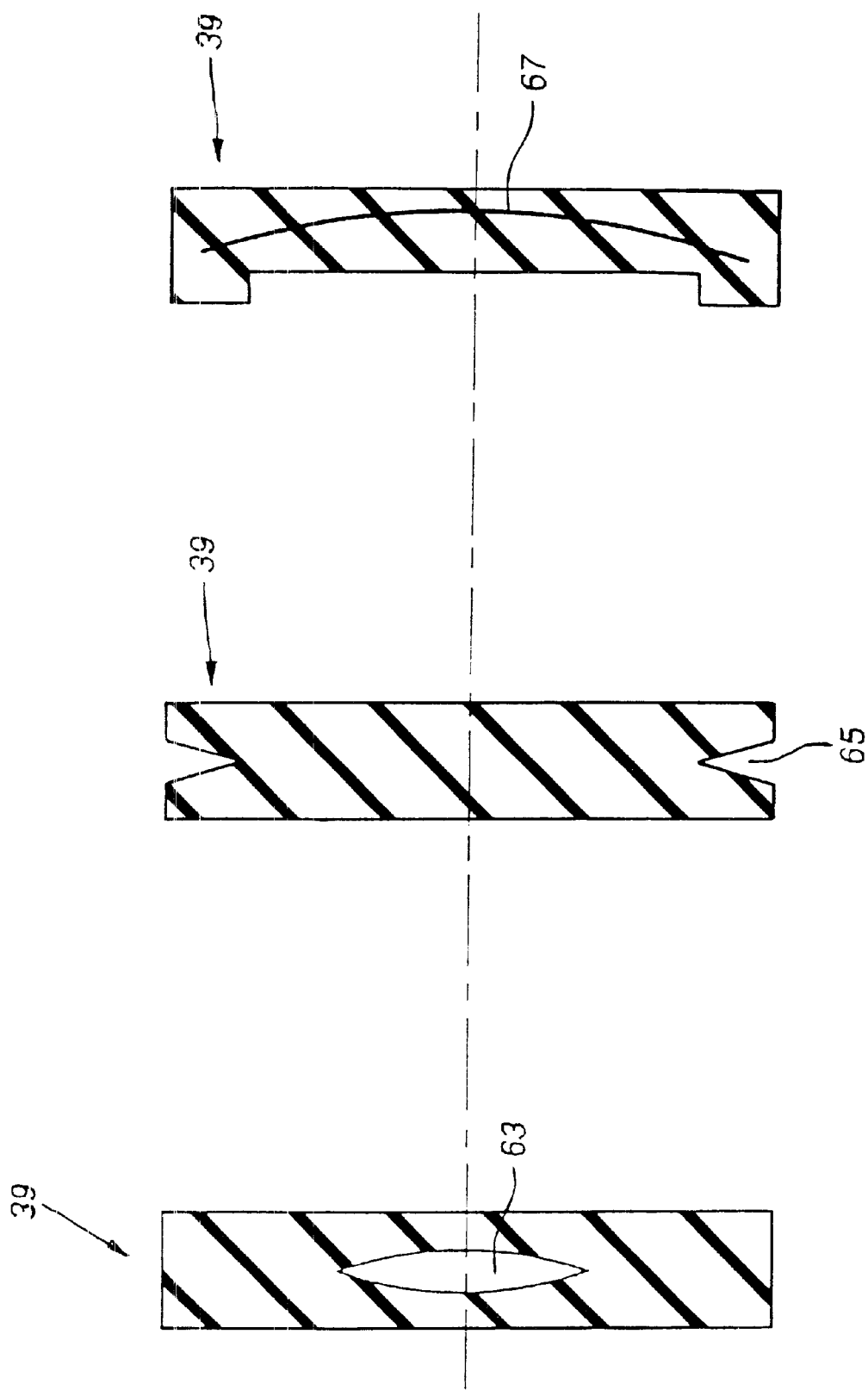

REACTION DISC HOUSING AND BRAKE SERVO UNIT COMPRISING SAME

This invention mainly relates to a receiving housing for a reaction disk and to a pneumatic servomotor for an assisted braking, including such housing fitted with its reaction disk.

BACKGROUND OF THE INVENTION

It is quite usual to amplify the force, which a driver exerts on a brake pedal, by means of a pneumatic servomotor (also called a "booster"), comprising a variable-volume front chamber, separated from a variable-volume rear chamber by a tight flexible diaphragm and by a rigid skirt driving a pneumatic piston which bears, through a push rod, on the primary piston of a tandem master cylinder of a hydraulic braking system. The front chamber, directed towards the tandem master cylinder, is hydraulically connected to a vacuum source whereas the rear chamber, in the opposite direction to the front chamber, is hydraulically connected, using a valve control, to a propellant fluid source, typically atmospheric-pressure air.

At rest, that is when the driver does not actuate the brake pedal, the front and rear chambers are interconnected, while the rear chamber is isolated from the atmospheric pressure. On braking, first the front chamber is isolated from the rear chamber and then air is admitted into the rear chamber.

Unfortunately, when the brake pedal is depressed, the sudden opening of the air-supply port of the rear chamber causes the pneumatic piston to move forward too fast. The initial resistance to the travel of this pneumatic piston is quite weak. As a matter of fact, on the one hand, there is a great pressure difference between the front and the rear chambers of the servomotor and, on the other hand, the operational clearances of the tandem master cylinder are taken up. This swift advance of the pneumatic piston may cyclically open the passage connecting up the front chamber and the rear chamber, which generates a noise resembling that of wipers set in motion on a dry windscreen and therefore called a "wiper noise" in the art. Such noise, although normal, is considered quite unpleasant by the users who fear some dysfunctioning of the system. Besides, the reopening of the passage connecting up the front and rear chambers of the servomotor reduces the assistance efficiency at the beginning of the braking process.

SUMMARY OF THE INVENTION

Therefore, it is an object of the present invention to provide a servomotor for an assisted braking, ensuring a noiseless running, especially by a reduction of the so-called "wiper noise" to the minimum.

Another object of this invention consists in providing a servomotor for an assisted braking with a quite high efficiency.

It is also an object of the present invention to provide a servomotor for an assisted braking, ensuring a quick-acting assistance.

It is another object of this invention to provide a braking system including a pneumatic assistance servomotor and a tandem master cylinder, equipped with superassistance means for emergency braking situations, of the types described in EP 0 662 894 and FR 2 751 602, and having a low variation of the starting threshold of superassistance means in the case of an emergency braking situation.

These objects are achieved, in accordance with this invention, by a pneumatic servomotor for an assisted braking, fitted with means capable of resisting too fast a forward travel of the pneumatic piston when the brake is actuated, which otherwise might lead to an undesired reopening of the passage connecting the front chamber with the rear chamber of the assistance servomotor.

These objects are achieved according to this invention, in that the compliance of a reaction disk is turned into account so as to resist too fast a forward travel of the piston. In the preferred embodiment of the invention, the substantially incompressible reaction disk is accommodated inside a housing, the inner space of which is greater than the volume of the disk. The deformation of the disk, during an initial braking stage, will result in a such a deformation of the disk as to enable it to fill completely its housing, which makes it act conventionally in the course of a subsequent braking stage. The applying of the reaction disk onto the distributor plunger or onto any other part, interlocking with the control rod for the control of the flaps, limits the forward speed of the pneumatic piston, when the brake is actuated, and prevents or restricts the undesired reopenings of the connecting passage between the front and rear chambers of the assistance servomotor.

The main subject of this invention is a receiving housing for a reaction disk, said housing being defined by stationary walls and by moving walls and accommodating an incompressible reaction disk of a braking servomotor, said reaction disk comprising a contact area associated with an element driven by a brake pedal, characterised in that, when the contact is made between the reaction disk and the element driven by the brake pedal, the housing of the reaction disk has an area which is taken by the incompressible reaction disk, and an area filled with a compressible fluid, enabling, in a first braking stage (jump stage) of the braking process, an elastic deformation of the reaction disk so that the latter may resiliently exert a mechanical reaction on said element driven by the brake pedal, and in that, during s second braking stage (the actual braking operation), the incompressible reaction disk will fill its housing in a substantially complete manner.

The present invention also deals with a housing, characterised in that it comprises two adjacent coaxial cylindrical areas, the first area having a first diameter corresponding to that of the reaction disk, and the second area having a second diameter, which is smaller than the first diameter.

Another subject matter still of the present invention is a housing, characterised in that the second area is radially bounded by a washer.

According to another aspect of the invention, a servomotor for an assisted braking is characterised in that it includes a housing.

The present invention also deals with a servomotor, characterised in that the housing is fitted with a reaction disk, including a radially-outer annular area which defines, together with the walls of the housing, an area of said housing to be filled with a compressible fluid.

Another subject matter still of the present invention is a servomotor, characterised in that the element driven by the brake pedal is a distributor plunger and in that the latter comprises a stub to be applied onto the reaction disk.

According to another aspect of the invention, a servomotor is characterised in that the reaction disk comprises at least one passage for the supply and discharge of the compressible fluid, respectively into and from the compressible area of the housing for the reaction disk.

Another subject of the invention is a servomotor, characterised in that, at rest, the element, which is driven by the brake pedal, is in contact with the reaction disk.

This invention also deals with a servomotor, characterised in that the element driven by the brake pedal comes into contact with the reaction disk, just as the flap closes for the tight separation of the front and rear chambers of the servomotor.

Another subject matter still of the present invention is a servomotor, characterised in that the reaction disk includes a resilient reinforcing insert.

Other features and advantages of the present invention will be apparent from the following detailed description, by way of example and by no means as a limitation, when taken in conjunction with the accompanying drawings.

BRIEF DESCRIPTION OF THE DRAWINGS

FIG. 9 is a longitudinal sectional view of a third embodiment of a reaction disk, capable of being implemented in a servomotor according to the present invention;

FIG. 10 is a longitudinal sectional view of a fourth embodiment of a reaction disk, capable of being implemented in a servomotor according to the present invention; and FIG. 11 is a longitudinal sectional view of a fifth embodiment of a reaction disk, capable of being implemented in a servomotor according to the present invention.

DETAILED DESCRIPTION OF THE INVENTION

Figure 1:
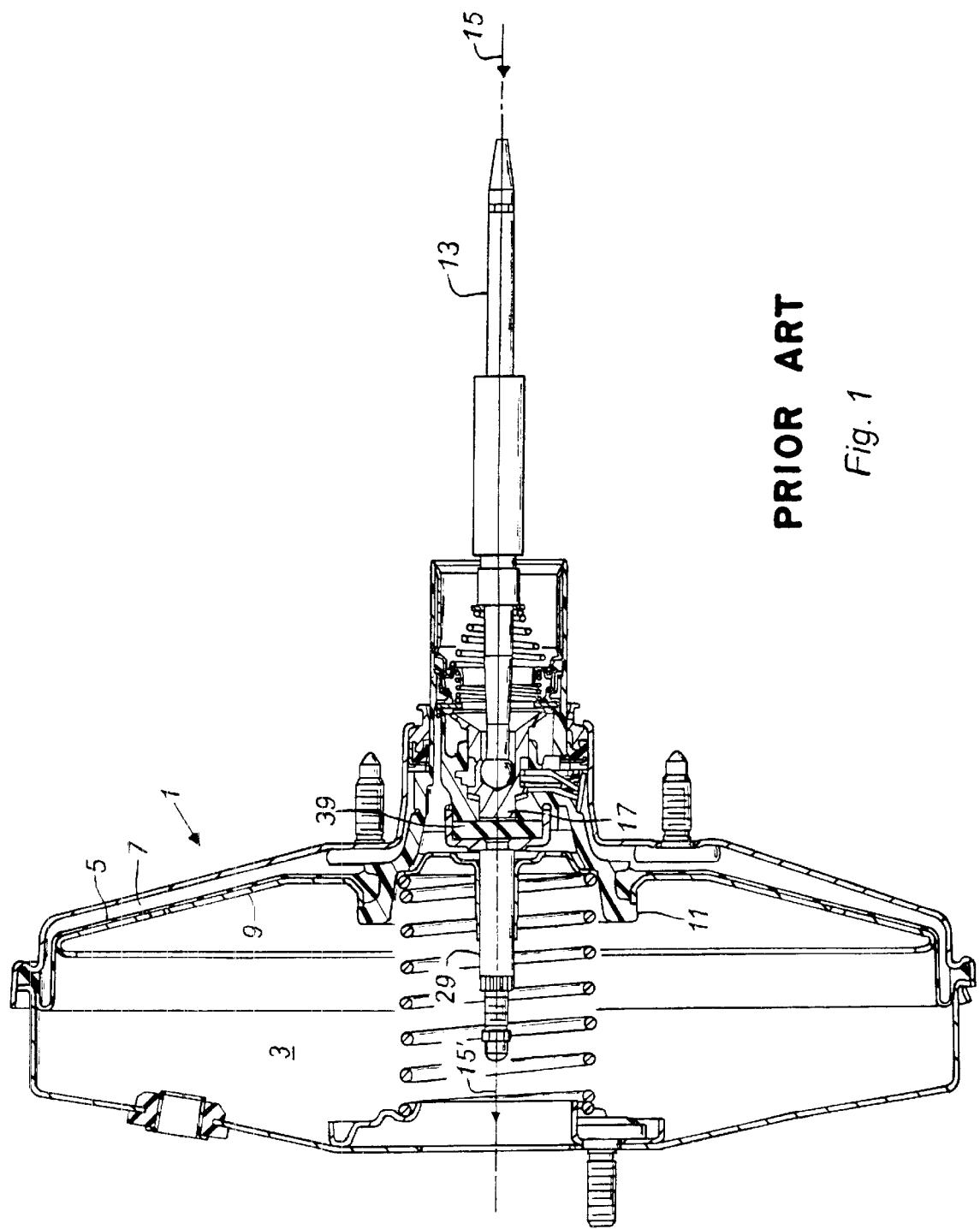
FIG. 1 is a longitudinal sectional view of an assistance servomotor of a well-known type.

In FIGS. 1 through 11, the same reference numerals will designate the same elements.

FIG. 1 shows a pneumatic servomotor 1 for an assisted braking of a well-known type, comprising a front chamber 3, separated from a rear chamber 7 by a tight diaphragm 5. The diaphragm 5 rests on a rigid skirt 9, driving a pneumatic piston 11 at the time of the volume variation of said chambers. A control rod 13, capable of being driven in the direction of the arrow 15 by a brake pedal (not shown), bears on a distributor plunger 17. This distributor plunger 17, as is more visible in FIGS. 2–4, controls a valve fitted with a first flap 19 shutting off, on actuation, a passage 21 connecting the front chamber 3 with the rear chamber 7 of the servomotor 1, and a second flap 23 opening, on actuation, the air-supply passage of the rear chamber 7 of said servomotor. The valve further comprises a return spring 25 for the flap and a spring 27, closing the valve when the brake is not actuated. The pneumatic piston 11 drives, in the direction of the arrow 15', a push rod 29 bearing on a primary piston of a tandem master cylinder (not shown).

The mode of operation of the servomotor of the known type will now be described with reference to FIGS. 2 through 4.

Figure 2:
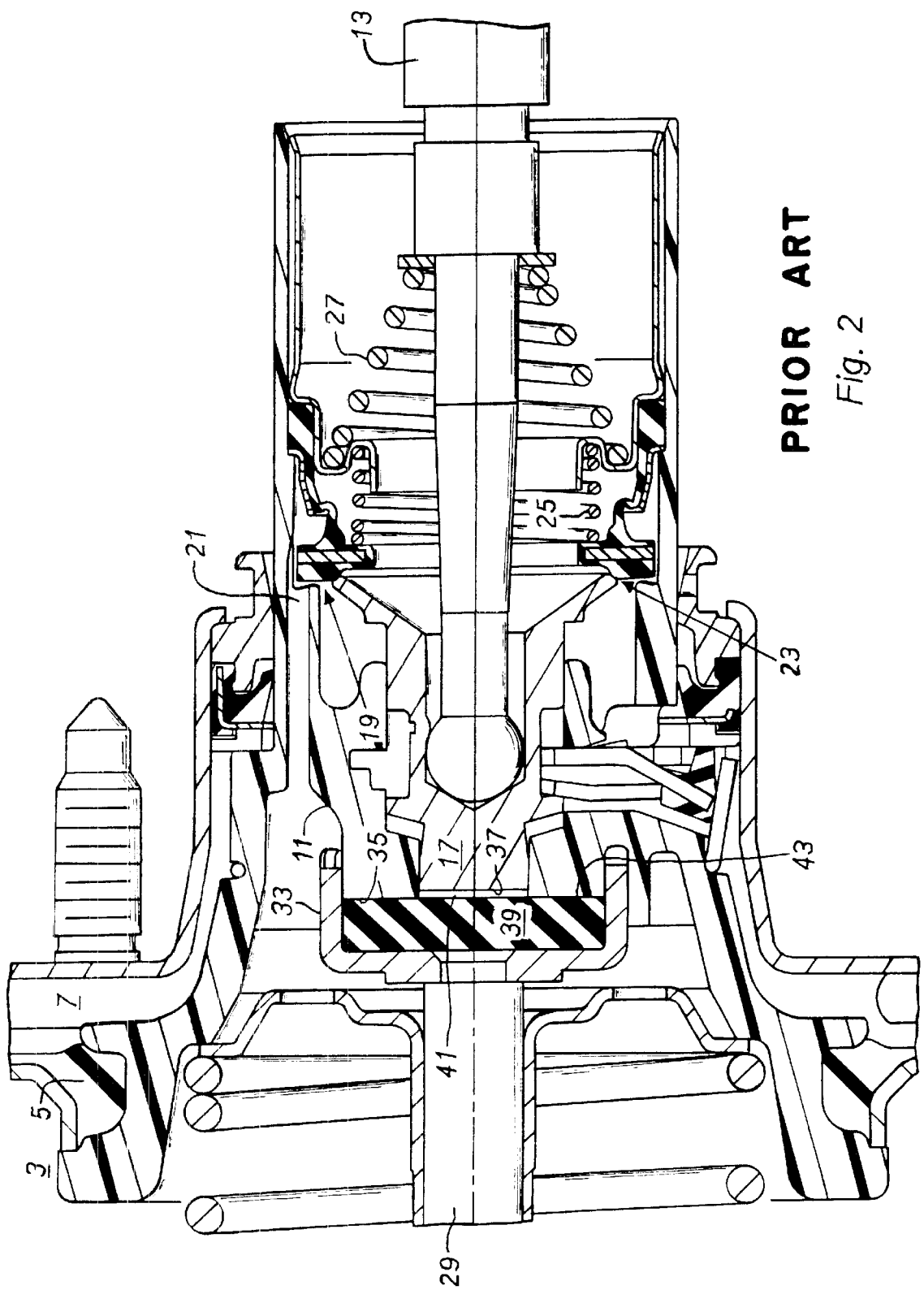
FIG. 2 is a longitudinal sectional view of a detail from FIG. 1, at rest.

FIG. 2 shows the system at rest, i.e. when the driver does not depress the brake pedal. The seats of the flaps 19 and 23 are axially offset in such a way that the forward travel of the control rod 13 in the direction of the arrow 15, in the first place, closes the flap 19 and then opens the flap 23. For a given position of the control rod 13, the flap 23 opens and closes periodically in order to set the push rod 29 in the desired position and, as a result, the desired pressure in the hydraulic circuit of the braking system.

At rest, the flap 19 is permanently open whereas the flap 23 is permanently closed. Thus, the same low pressure exists in the front chamber 3 and in the rear chamber 7.

Figure 3:
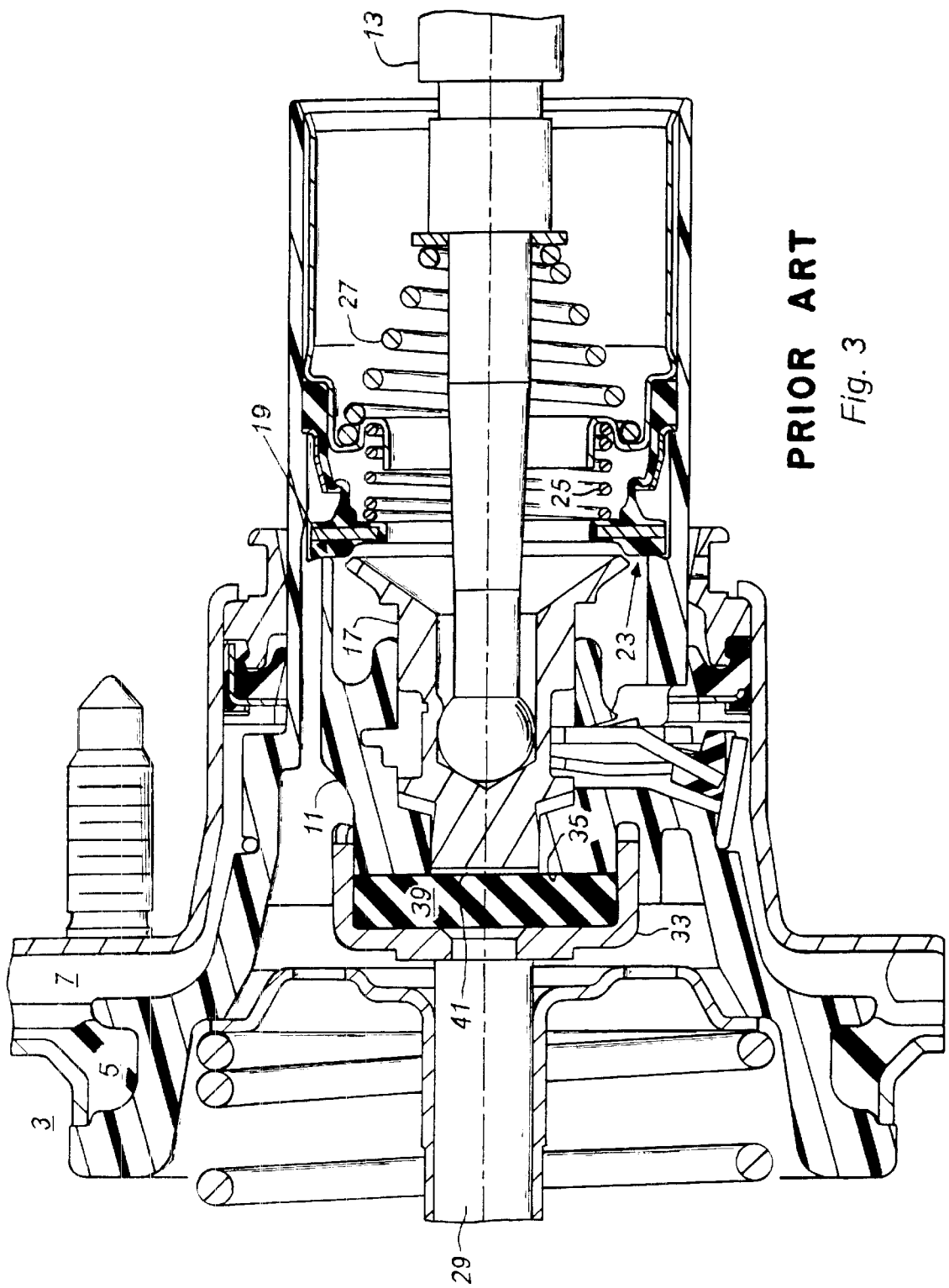
FIG. 3 is a view of the servomotor, similar to FIG. 1, but in a state in which the front and rear chambers are mutually isolated, while the rear chamber is supplied with air.
Figure 4:
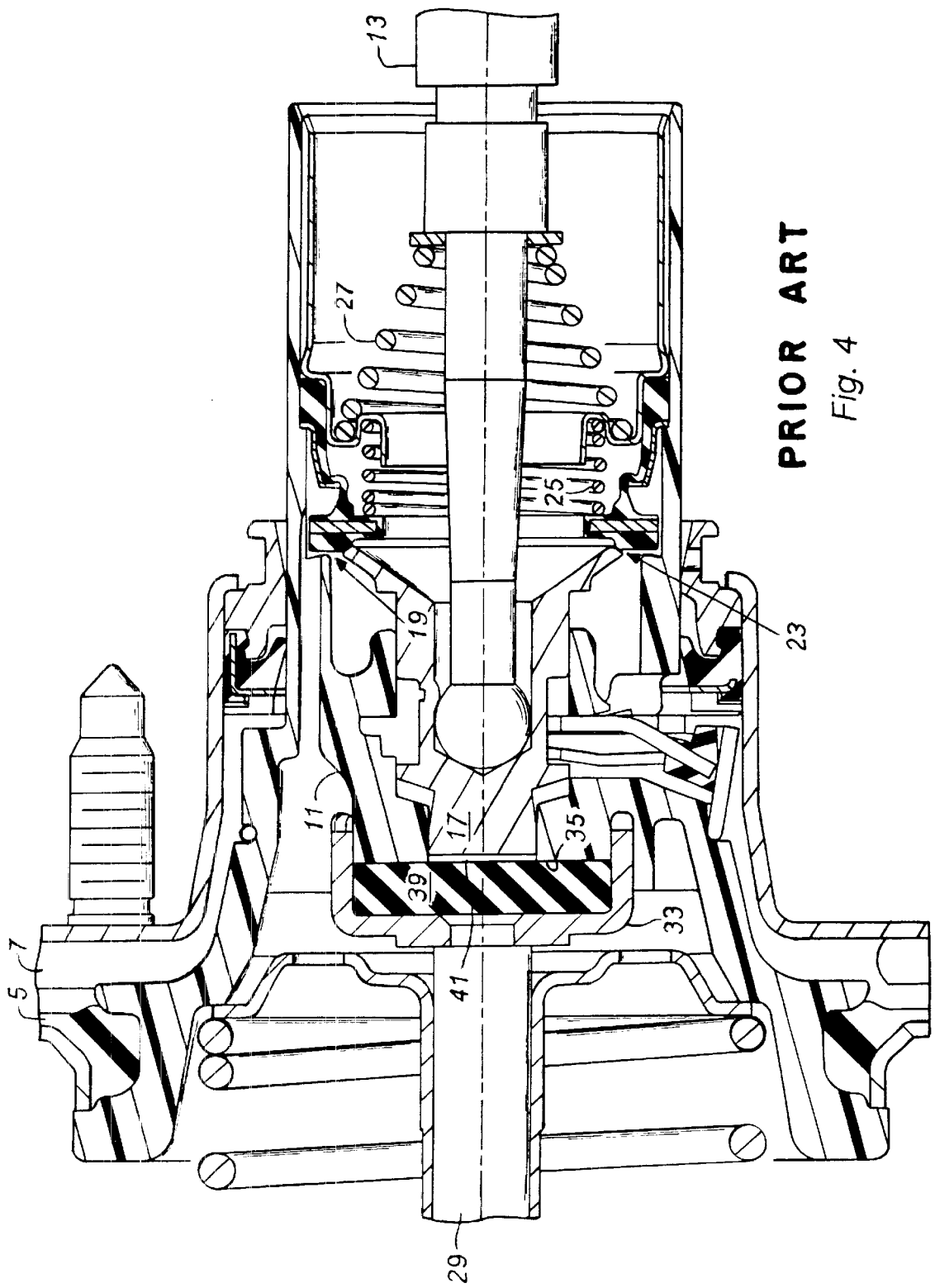
FIG. 4 is a similar view, in the event of an undesired opening of the connecting passage between the front chamber and the rear chamber.

When the driver depresses the brake pedal, the control rod 13 moves forward, as shown in FIG. 3, and it drives the distributor plunger 17, thus closing the flap 19 and opening the flap 23. The atmospheric-pressure air rushes into the rear chamber 7. The pressure difference drives the skirt 9 which, in turn, moves the pneumatic piston 11 forward. In the first instance, the pneumatic piston does not meet with a noticeable resistance to its forward travel, till all the mechanical clearances at the tandem master cylinder of the hydraulic braking system are compensated. Thus, as represented in FIG. 4, such piston moves forward faster that said distributor plunger 17, borne by the control rod 13, which undesiredly causes the flap 19 to open. When the pressures are equalized between the front chamber 3 and the rear chamber 7, the piston is slowed down, thus allowing the distributor plunger 17 to close the flap 19 (state represented in FIG. 3), with the result that the pneumatic piston 11 moves forward, which means the reappearance of the state illustrated in FIG. 4, in which the flap 19 is open. The cyclic changeover from one state to the other one, as respectively shown in FIGS. 3 and 4, gives rise to the so-called "wiper noise", which is quite undesired and, moreover, it leads to an undesired supply of the front chamber 3 with air, thus reducing the efficiency of the pneumatic assistance servomotor.

After the initial braking stage, the push rod 29 drives, in the direction of the arrow 15', a primary piston of a tandem master cylinder (not shown) for the supply of the brake cylinders with a pressure brake fluid, so as to apply the friction elements onto the disks and/or the drums. The reaction of the brake and of the tandem master cylinder gives rise to a mechanical reaction, which prevents the reopening of the flap 19, during the second braking stage (the actual braking operation).

The end of the push rod 29, in the opposite direction to that facing the tandem master cylinder, bears a cup 33 constituting, together with the front face 35 of the central part of the pneumatic piston 11 and with the front face 37 of the distributor plunger 17, a receiving housing for a reaction disk 39, made of an almost incompressible material (typically an elastomer). The reaction disk 39 of the servomotor 1 of a known type entirely fills its receiving housing, with the exception of a gap 41, remaining between a rear face 43 of the reaction disk and a front face 37 of the distributor plunger 17.

The reaction disk 39 of the servomotor 1 of a known type does not transmit the reaction, generated at the tandem master cylinder, to the distributor plunger 17 during the initial braking stage, the so-called jump stage.

The pneumatic servomotor 31 for an assisted braking (FIG. 6) according to this invention differs from the servomotor 1 of the well-known type, shown in FIGS. 1 through 4, in that it comprises means for delaying, at the beginning of the braking operation (typically before the mechanical clearance take-up at the tandem master cylinder) the forward travel of the pneumatic piston 11 in the direction of the arrow 15', so as to prevent it from moving faster than the distributor plunger 17 and consequently in order to preclude any undesired opening, in the course of the braking operation, of the flap 19 arranged between the front chamber 3 and the rear chamber 7 of the servomotor 31 according to the present invention.

Figure 5:
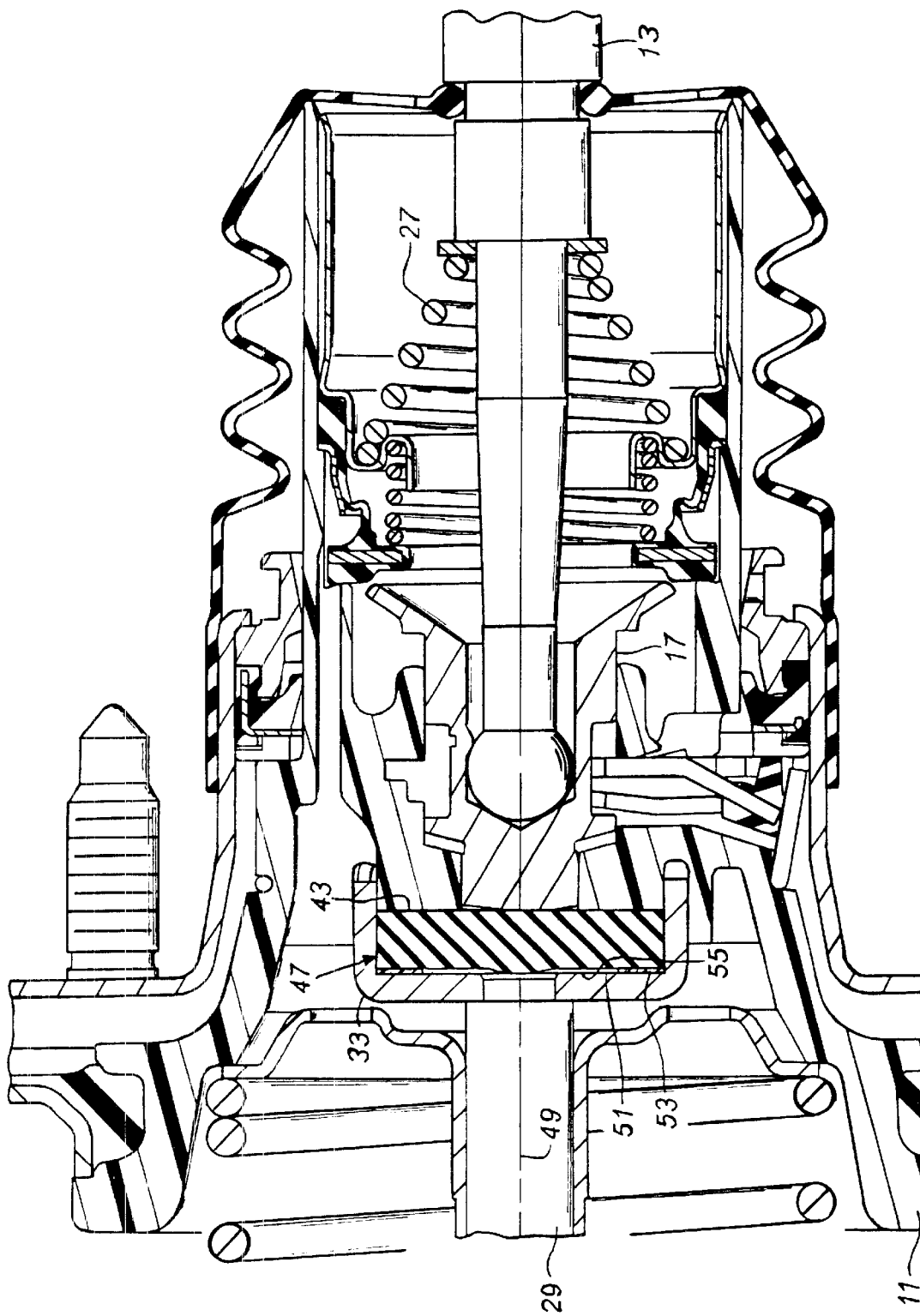
FIG. 5 is a longitudinal sectional view of the central part in a first embodiment of a servomotor according to the present invention.
Figure 6:
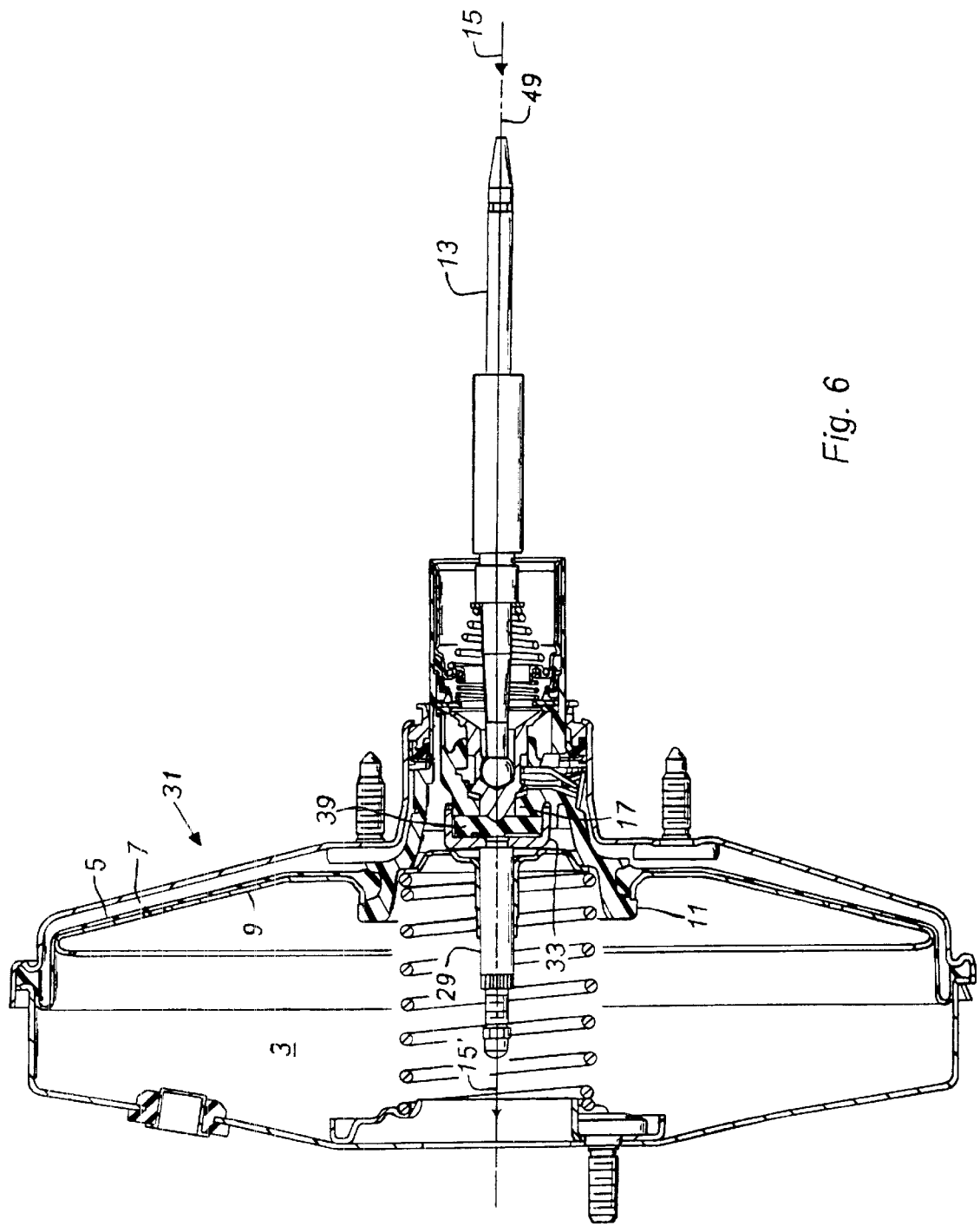
FIG. 6 is a longitudinal sectional view of a second embodiment of a servomotor according to the present invention.
Figure 7:
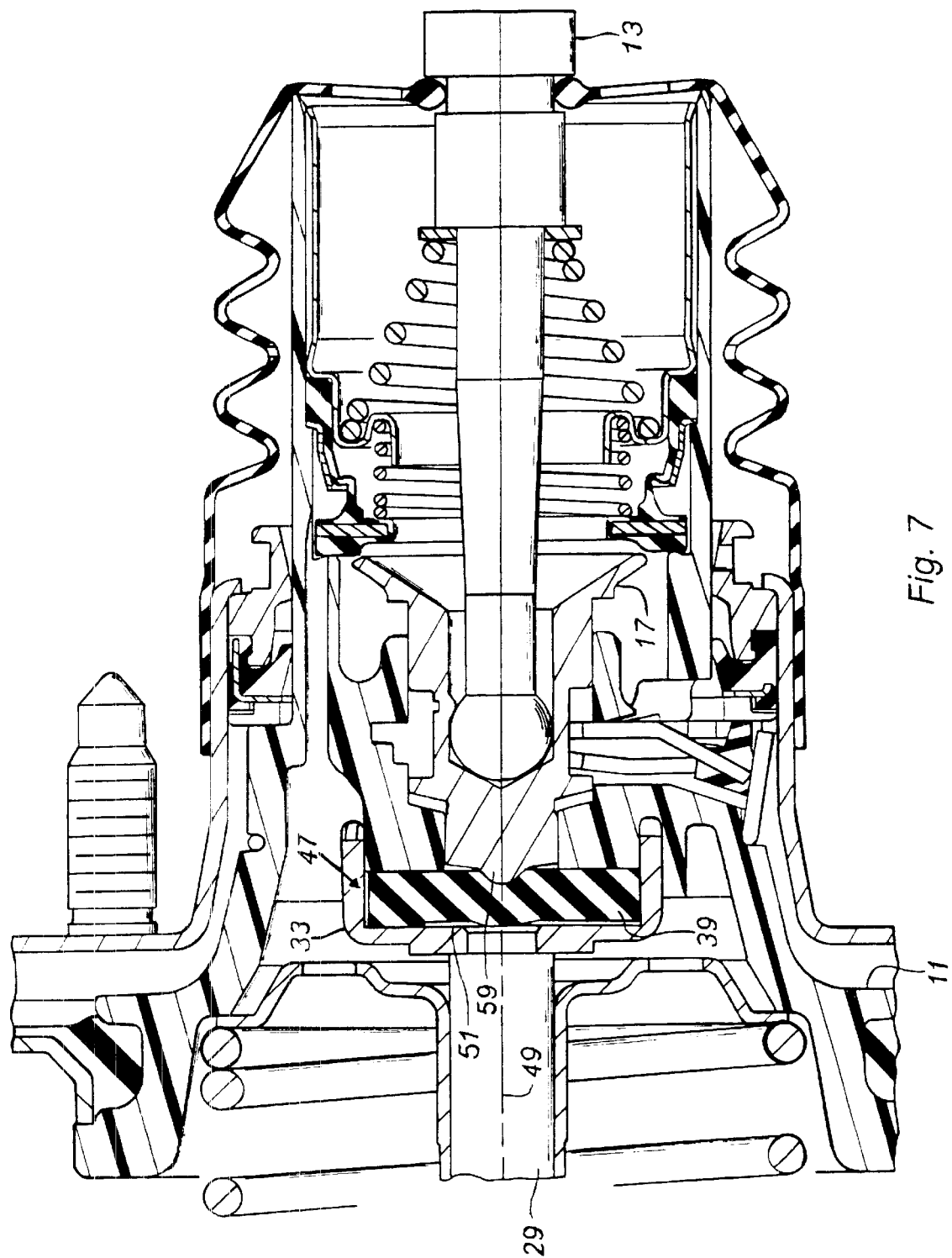
FIG. 7 is an enlarged view of the central part according to FIG. 6.

As shown in FIGS. 5 through 7, the servomotor 31 for an assisted braking according to the present invention comprises a housing 47 for the reaction disk 39, the inner space of the former being greater than the incompressible volume of the reaction disk 39, when the front face 37 of the distributor plunger 17 is in contact with the rear face 43 of the reaction disk 39, so as to allow an elastic deformation of the reaction disk 39 owing to a thrust exerted by the distributor plunger 17, in the direction of the arrow 15', in the course of the initial braking stage. The reaction force, which is resiliently exerted by the reaction disk, during said initial braking stage, prevents or limits undesired reopenings of the flap 19.

In the example according to FIG. 5, the reaction disk 39 has a cylindrical shape and its receiving housing 47 comprises a first rear cylindrical area with an axis 49, corresponding to the axis of the servomotor, and the diameter of which is equal to the inner diameter of the cup 33, and an adjoining second front cylindrical area 51, with an axis 49 and the diameter of which is smaller than the diameter of the first rear cylindrical area.

The front cylindrical area 51 is radially bounded by a washer 53 or by a shoulder of the cup 33, providing a support for the peripheral area of the front face 55 of the reaction disk 39.

In an alternative embodiment, the front face 37 of the distributor plunger 17 bears permanently on the rear face 43 of the reaction disk 39.

In an advantageous manner, the contact between the reaction disk 39 and the front face 37 of the distributor plunger 17 takes place right after the closing of the flap 19 and before the opening of the flap 23.

It should be noted that, in FIG. 5, the reaction disk is represented in the non-stressed condition whereas, in FIGS. 6 and 7, it is illustrated in a partially stressed state, in order to show the gap provided in the receiving housing 47 of the reaction disk 39.

In the embodiment in accordance with FIGS. 6 and 7, the housing 47 of the reaction disk 39 has a substantially cylindrical shape, and the reaction disk has, on its front face 55, a radially-outer annular area 57, capable of bearing on the rear face of the wall of the cup 33, perpendicular to the axis 49. The area 57 defines an area 51, either empty or filled with air, forwardly of the reaction disk 39 inside the housing 47.

In the advantageous example as shown in FIGS. 6 and 7, the front face 37 of the distributor plunger 17 comprises a central stub 59 for a localized elastic deformation of the reaction disk 39.

Figure 8:
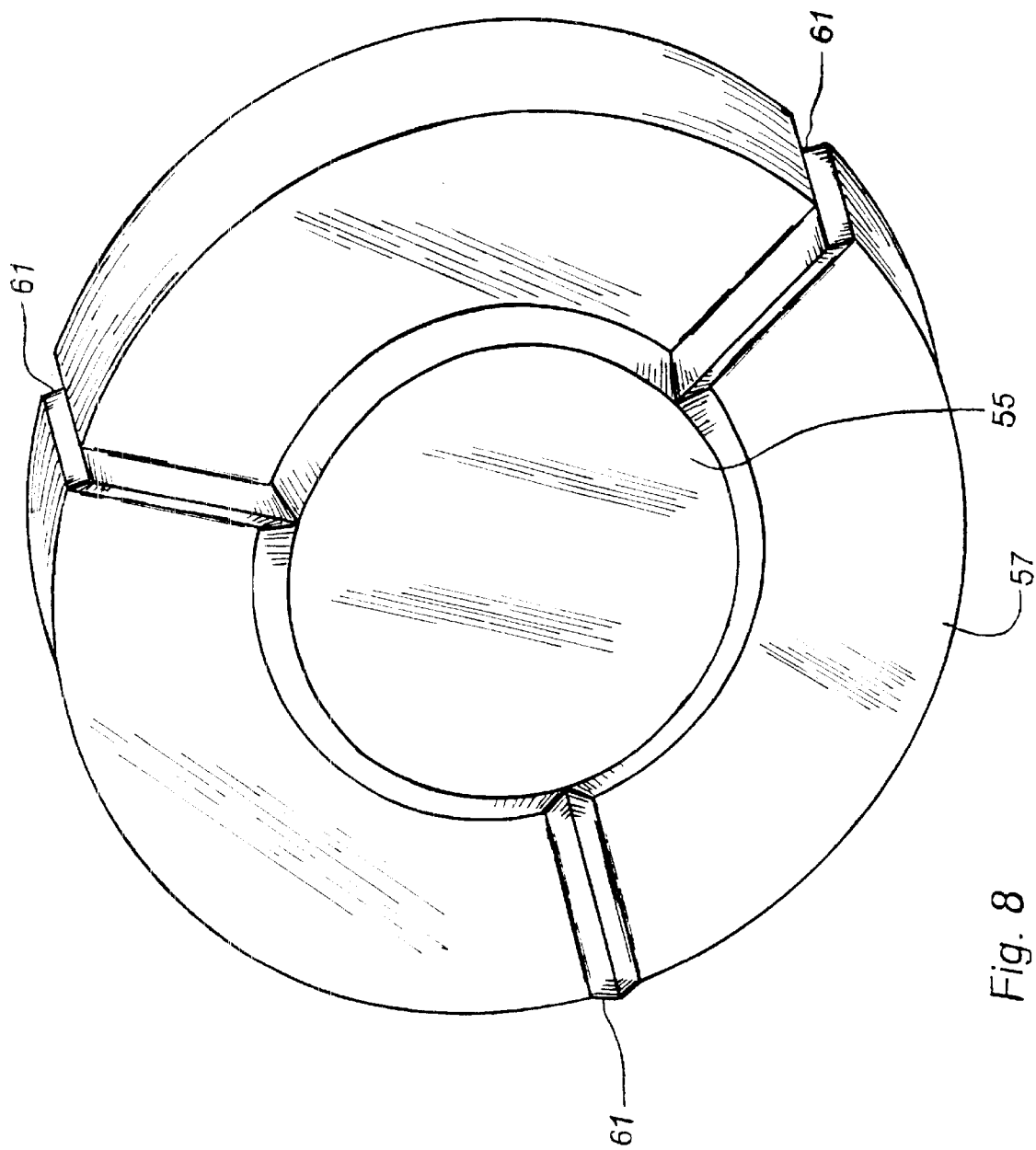
FIG. 8 is a perspective view of a third embodiment of a reaction disk, capable of being implemented in a device according to this invention.

FIG. 8 represents a reaction disk 39 having a plane rear face and a front face 55 provided with a peripheral annular area 57, in which radial passages 61 have been made for the air circulation, so as to avoid the so-called suction effect. In the illustrated advantageous example, the reaction disk 39 exhibits three passages 61 at regular angular spacings. In an advantageous manner, the passages 61 are prolonged, parallel to the axis 49, into the radially-outer part of the cylinder.

FIG. 9 represents a reaction disk 39 having an area 63 either empty or filled with a compressible fluid, such as plain air or nitrogen. Thus, at rest, the outer volume of the reaction disk 39 of FIG. 9 is capable of entirely filling the receiving housing 47 for said disk, while preserving an adequate elastic property for the control of the forward travel of the moving elements during the initial braking stage.

FIG. 10 shows an embodiment of a reaction disk including a peripheral groove, for instance in the shape of a capital V.

The reaction disks for an implementation in the pneumatic servomotors according to this invention may be made of any conventional material intended for reaction disks, such as elastomers, more particularly rubber. Besides, as shown in FIG. 11, they may be fitted with a reinforcing insert 67, consisting of a resilient material, such as a metal, in an advantageous manner spring steel, plastics or composites. Advantageously too, the shape of the reinforcing insert 67 is adjusted to the resilient behaviour required of the reaction disk. Therefore, disk-shaped reinforcing inserts may be used or, as illustrated, said reinforcing inserts may look like a portion of a sphere, advantageously with spaced radial notches. Alternatively, the reinforcing insert 67 will be star-shaped.

The servomotor according to the present invention can be installed in any braking system whatsoever and, in particular, in braking systems using a single master cylinder or, preferably, a tandem master cylinder. And it is more specially advantageous in the case of a master system for a superassisted emergency braking, as disclosed in patent applications EP 0 662 894 and FR 2 751 602, which are included herein by way of reference.

The present invention concerns, more particularly, the motor car industry.

And the present invention mainly applies to the design and manufacturing of motor vehicle braking systems.

We claim:

1. A receiving housing (47) for a reaction disk (39), said housing (47) being defined by stationary walls and by moving walls for accommodating said reaction disk (39) of a braking servomotor, said reaction disk (39) comprising a contact area associated with an element (17) driven by a brake pedal, characterised in that, when the contact is made between the reaction disk (39) and the element (17) driven by the brake pedal, the housing (47) of the reaction disk (39) has an area which is filled by said reaction disk (39), and an area (51) filled with a compressible fluid, enabling, in a first braking stage (jump stage) of a braking process, an elastic deformation of the reaction disk (39) into said area (51) so that the reaction disk (39) may resiliently exert an initial mechanical reaction on said element (17) driven by the brake pedal, and in that, during a second braking stage (the actual braking operation), said reaction disk (39) completely fills said housing (47) to provide a hydraulic reaction corresponding to the brake force developed during said brake operation.

2. The housing (47) according to claim 1, characterised in that it comprises two adjacent coaxial cylindrical areas, the first area having a first diameter corresponding to that of the reaction disk (39), and the second area having a second diameter, which is smaller than the first diameter.

3. The housing (47) according to claim 2, characterised in that the second area is radially bounded by a washer (53).

4. The housing (47) according to claim 1, wherein said reaction disk (39) is characterised by an radially-outer annular area (57) which defines, together with the walls of said housing, an area of said housing (47) to be filled with a compressible fluid.

5. The housing (47) according to claim 4, characterised in that said element (17) driven by the brake pedal is a distributor plunger having a stub (59) that engages said reaction disk (39).

6. The housing (47) according to claim 1, characterised in that said reaction disk (39) comprises at least one passage (61) for the supply and discharge of the compressible fluid, respectively into and from the compressible area (51) of the housing (47).

7. The housing (47) according to claim 6, characterised in that, at rest, said element (17), which is driven by the brake pedal, is in contact with the reaction disk (39).

8. The housing (47) according to claim 6, characterised in that said element (17) driven by the brake pedal comes into contact with said reaction disk (39), when a flap (19) closes for isolating a front chamber (3) from a rear chamber (7) of the servomotor.

9. The housing (47) according to claim 1, characterised in that said reaction disk (39) includes a resilient reinforcing insert (67).

* * * * *